United States Patent
Kim

(10) Patent No.: US 8,154,488 B2
(45) Date of Patent: Apr. 10, 2012

(54) LIQUID CRYSTAL DISPLAY MODULE HAVING CONTACT PROTRUSION BETWEEN TOP CHASSIS AND BOTTOM CHASSIS

(75) Inventor: Taek-young Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 917 days.

(21) Appl. No.: 12/013,046

(22) Filed: Jan. 11, 2008

(65) Prior Publication Data
US 2009/0160745 A1    Jun. 25, 2009

(30) Foreign Application Priority Data
Dec. 20, 2007    (KR) .................. 10-2007-0134520

(51) Int. Cl.
*G09G 3/36* (2006.01)
(52) U.S. Cl. .......................................... 345/87; 349/65
(58) Field of Classification Search .............. 345/87
See application file for complete search history.

(56) References Cited

U.S. PATENT DOCUMENTS

| | | | |
|---|---|---|---|
| 6,502,945 B2* | 1/2003 | Kim et al. | 362/27 |
| 2003/0169383 A1* | 9/2003 | Kim | 349/58 |
| 2005/0259192 A1* | 11/2005 | Lee | 349/58 |
| 2006/0109643 A1* | 5/2006 | Chang | 362/97 |

* cited by examiner

*Primary Examiner* — Alexander Eisen
*Assistant Examiner* — Robin Mishler
(74) *Attorney, Agent, or Firm* — Cantor Colburn LLP

(57) ABSTRACT

A liquid crystal display module with a thermal passage between a bottom chassis and top chassis is presented. The liquid crystal display module includes a top chassis and a bottom chassis. The top chassis has an inwardly elongated contact protrusion on a lateral cover. The contact protrusion connects the lateral cover and a side wall of the bottom chassis. Here, near the contact protrusion, a light source of the liquid crystal display module is located, and at least a portion of the light source heat can migrate outside rather than being trapped inside of the liquid crystal module.

22 Claims, 8 Drawing Sheets

LIQUID CRYSTAL DISPLAY MODULE HAVING CONTACT PROTRUSION BETWEEN TOP CHASSIS AND BOTTOM CHASSIS

This application claims priority to Korean Patent Application No. 10-2007-0134520, filed on Dec. 20, 2007 and all the benefits accruing therefrom under 35 U.S.C. §119, and the contents of which in its entirety are herein incorporated by reference.

BACKGROUND OF THE INVENTION

1. Field of the Invention

The present invention relates to a liquid crystal display (LCD) module structure, and more particularly, the present invention relates to a LCD module structure having a contact protrusion between a bottom chassis and a top chassis for efficiently dissipating heat from a light source.

2. Description of the Related Art

As display devices are used in everyday life, the liquid crystal display (LCD) has been gaining popularity. The LCD has a LCD module, image driving circuitry and outer frames encompassing the LCD module and the image driving circuitry. The LCD module has a liquid crystal (LC) panel which includes a pair of opposing substrates with a LC layer therebetween. Here, the LC layer may change its optical characteristics according to the temperature around the LC layer.

The LCD module also has a backlight assembly since the liquid crystal layer is not self-emissive. The backlight assembly is located behind the LC panel to provide light to the LC layer with a light source. The backlight assemblies includes a light source, a light guiding plate (LGP) next to the light source and optical sheets interposed between the LC panel and the LGP for controlling light trajectory.

Next, the LC panel and the backlight assembly are fixed firmly with a top chassis and a bottom chassis located over the LC panel and under the backlight assembly, respectively.

While operating a LCD module, the light source continuously emits light and heat that might be transferred to the LC layer. If excessive heat is transferred to the LC layer, LC molecules in the LC layer may move erratically allowing undesirable light to leak through the LC layer. In other words, too much heat around the light source may cause poor image quality in the LCD.

To enhance the heat dissipation of the LCD module, the light source is located near the bottom chassis and/or top chassis whose heat conductivity is higher than other parts of the LCD. However, as the LCD module becomes thinner and more compact, heat dissipation is not enough to control the temperature of the LC molecule.

BRIEF SUMMARY OF THE INVENTION

Thus, it is an aspect of the invention to provide a liquid crystal display (LCD) module structure having improved heat dissipation near the liquid crystal panel and the light source of the LCD module.

According to an embodiment of the invention, an LCD module includes a liquid crystal (LC) panel, a backlight assembly, a top chassis and a bottom chassis. The LC panel and the backlight assembly are encompassed by the top chassis and the bottom chassis at a front and a rear side of the LCD module, respectively.

The LC panel has an active display area and an edge portion around the active display area. The backlight assembly is located under the LC panel to provide light to the LC panel. Here, the bottom chassis receives the backlight assembly with a bottom plane and a plurality of side walls. Then, the top chassis covers the edge portion of the LC panel and overlaps a lateral portion of both the LC panel and the backlight.

In detail, the top chassis and the bottom chassis are commonly located near the light source with overlapping relationship of a lateral cover of the top chassis and the side wall of the bottom chassis for heat dissipation. Further, an additional contact protrusion is interposed within the overlap area of the lateral cover of the top chassis and the side wall of the bottom chassis. Specifically, the contact protrusion stems from the lateral cover of the top chassis and extends to the side wall of the bottom chassis for making a heat transfer passage.

According to another embodiment of the invention, a LCD module has a top chassis having a lateral cover along with a bottom chassis having a side wall which overlaps with the lateral cover. Specifically, the lateral cover gets thicker from the LC panel edge covering portion to the LCD module. The lateral cover and the side wall thermally communicate through a heat passage.

In detail, the lateral cover of the top chassis has an opening at the position the heat passage is connected and the opening exposes the side wall of the bottom chassis. With the opening, hot air can flow out more efficiently from the light source area.

According to yet another embodiment of the invention, a thermal conductivity of a top chassis in a LCD module is higher than the thermal conductivity of a bottom chassis as a lateral cover of the top chassis is disposed outer than a side wall of the bottom chassis.

According to still another embodiment of the invention, a heat passage between a lateral cover of a top chassis and a side wall of the bottom chassis is formed at a different location from a unifying member that combines the top chassis and the bottom chassis.

According to another embodiment of the invention, a LCD module has a top chassis, a bottom chassis and a middle frame which supports a LC panel within a space made by the top chassis and the bottom chassis. While supporting the LC panel, the middle frame has a vertical edge which is bent and extends vertically to be located between a lateral cover of the top chassis and a side wall of the bottom chassis.

The vertical edge of the middle frame has a cutout which uncovers a portion of the side wall of the bottom chassis. The cutout may be used to aid heat dissipation near where a light source is located. Moreover, heat may be transferred outside with a contact protrusion which connects the lateral cover of the top chassis and the side wall of the bottom chassis via the cutout of the vertical edge.

According to still another embodiment of the present invention, a top chassis and a bottom chassis are interconnected by a heat passage at a vertical structure of both the top chassis and bottom chassis. Here, the bottom chassis has a bottom plane that supports a light guiding plate (LGP), a side wall that extends from the bottom plane and a top plane which is bent from the side wall. The bottom plane, the side wall and the top plane are not separable and manufactured at the same time.

Further, a light source is located near the side wall of the bottom chassis without another rigid light reflecting member. That is to say, light may be reflected by the bottom chassis itself or a flexible reflecting sheet that covers the inner side of the side wall and the bottom plane of the bottom chassis.

BRIEF DESCRIPTION OF THE DRAWINGS

The above and/or other aspects and advantages of the present invention will become apparent and more readily appreciated from the following description of the exemplary embodiments, taken in conjunction with the accompanying drawings of which.

DETAILED DESCRIPTION OF THE INVENTION

Figure 1:
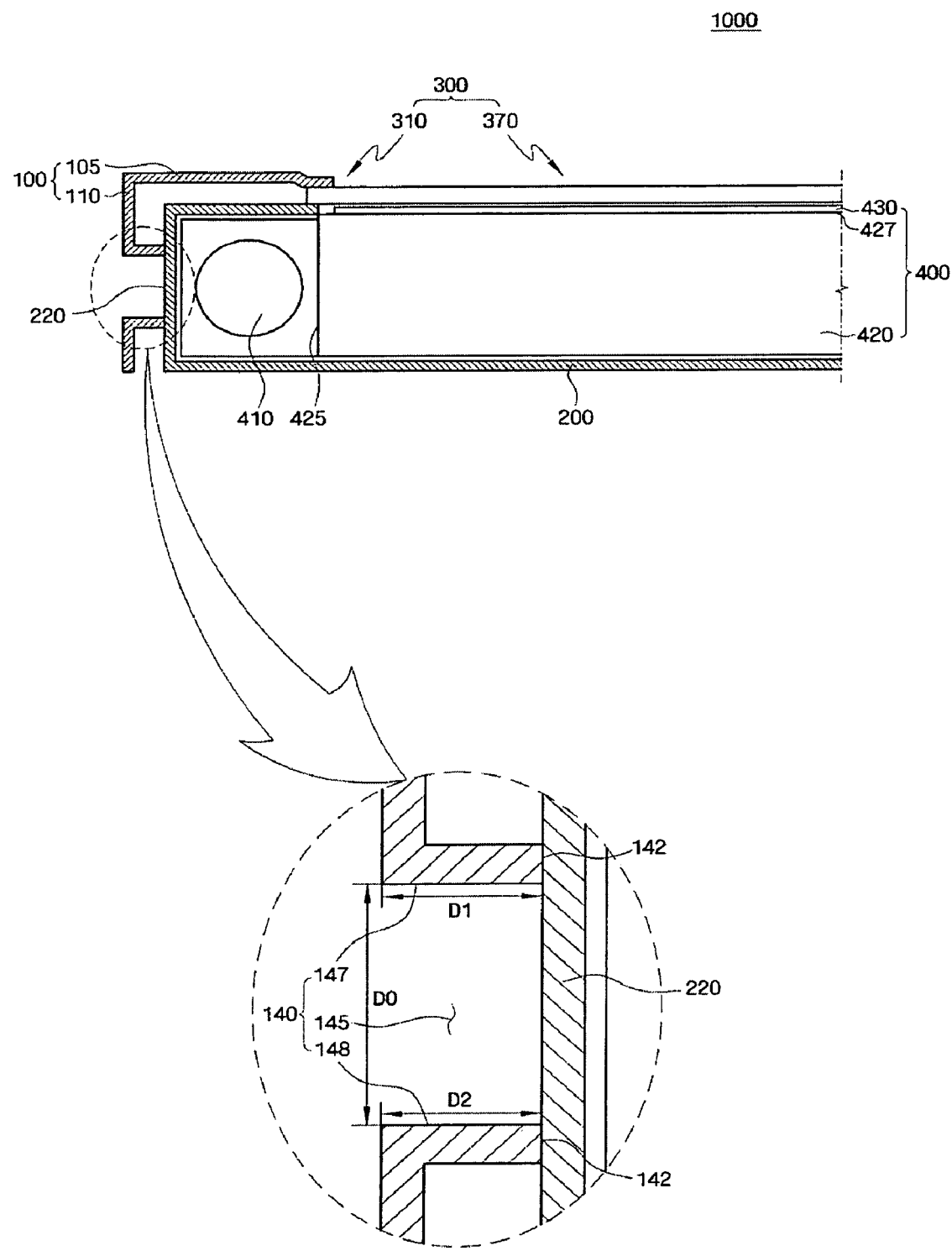
FIG. 1 is a cross-sectional view of a liquid crystal display (LCD) module having a contact protrusion at an edge part of a LCD module.

Reference will now be made in detail to exemplary embodiments of the present invention, examples of which are illustrated in the accompanying drawings, wherein like reference numerals refer to like elements throughout. The embodiments are described below in order to explain the present invention by referring to the figures.

FIG. 1 is a cross-sectional view of a liquid crystal display (LCD) module having a contact protrusion at an edge part of a LCD module. Referring to FIG. 1, an LCD module 1000 has a top chassis 100 and a bottom chassis 200 to form the outer structure of the LCD module 1000. Specifically, the top chassis 100 covers the bottom chassis 200 at the edge of the LCD module 1000. Inside the LCD module 1000, a liquid crystal (LC) panel 300 is disposed horizontally while having a flexible film (not shown) for transmitting an electric signal to the LC panel 300 from outer circuitry (not shown).

Behind the LC panel 300, a backlight assembly 400 provides light to the LC panel 300. The backlight assembly 400 has a light source 410 at an edge of the backlight assembly 400, a light guiding plate (LGP) 420 next to the light source 410 and an optical sheet 430 over the LGP 420. Here, light source 410 may be a Cold Cathode Fluorescent Lamp (CCFL) 415 as depicted in FIG. 1. The LGP 420 has a light incident surface 425 for accommodating light and a light emitting surface 427 for exiting light to the LC panel 300.

For acquiring high luminance of the LCD module 1000, a plurality of CCFLs 415 can be used at one edge of the backlight assembly 400. Otherwise, for even higher luminance, a plurality of edges of the backlight assembly 400 can be placed with a plurality of light source parts within the LCD module 1000.

While operating the LCD module 1000, not all the electricity given to the CCFL 415 is converted to optical energy. That is, a certain amount of electricity is undesirably converted into thermal energy. Accordingly, as more electricity to one CCFL 415 and/or an increased number of CCFLs 415 is provided to the backlight 400, the vicinity of the CCFL 415 can overheat.

Here, unfortunately, the excessive heat can be transferred to the LC panel 300 because the LC panel 300 is closely located to the CCFL 415. Apparently, the edge portion 310 of the LC panel 300 is more directly influenced by the overheating of the CCFL 415 than any other portions of the LC panel 300. Consequently, an irregular image can be observed when the LCD module 1000 is in use.

To prevent the heat from migrating to LC panel 300, the excessive heat should be moved away from the LCD module 1000. Namely, the heat passage from CCFL 415 to an outer space is provided within the LCD module 1000. In connection with that heat releasing structure, a contact protrusion 140 is provided between the bottom chassis 200 and the top chassis 100 in the vicinity of the CCFL 415.

In detail, as depicted in FIG. 1, the top chassis 100 has a lateral cover 110 which is connected with a side wall 220 of the bottom chassis 200 by the contact protrusion 140. In FIG. 1, the contact protrusion 140 stems from the lateral cover 110 of the top chassis 100; otherwise, the contact protrusion 140 may stem from the side wall 220 of the bottom chassis 200.

Regardless of the origin of the contact protrusion 140, the contact protrusion 140 is interposed between the lateral cover 110 of the top chassis 100 and the side wall 220 of the bottom chassis 200 as long as the excessive heat can be moved out.

Further, full contact of the contact protrusion 140 to the other part may enhance heat conductivity. Namely, as shown in FIG. 1, when the innermost part 142 of the contact protrusion 140 fully contacts the side wall 220 of the bottom chassis 200, the heat may be transferred more efficiently than when partially contacting a structure. However, the portion of contacting an area with the innermost part 142 of the contact protrusion 140 may differ as long as the excessive heat can be controlled.

In other aspects, both the top chassis and the bottom chassis 100, 2000 are made of highly thermal conductive material such as aluminum (Al), Stainless Steel or Steel, Electrogalvanized, Cold Rolled, Coil (SECC). When completing the LCD module 1000, the top chassis 100 may be made from a different material than the bottom chassis 200 as long as the thermal conductivity of the material is high enough to dissipate heat.

In this regard, the material of the top chassis 100 may have higher thermal conductivity than the material of the bottom chassis 200 as the lateral cover 110 of the top chassis 100 is placed further out than the side wall 220 of the bottom chassis 200. One example of the combination may be an aluminum top chassis 100 and an SECC bottom chassis 200 as aluminum is more thermally conductive than SECC. In addition to the thermal aspect, the aluminum and SECC combination may be beneficial to manufacturing costs since SECC is generally cheaper than aluminum.

Other notable structures of the contact protrusion 140 lie in an opening 145. Specifically, the opening 145 can be made by punching of the lateral cover 140 of the top chassis 100 inwardly. Then, the punched part of the lateral cover moves inwardly and forms a protrusion body 147 of the contact protrusion 140. Here, the length of the opening O1 is substantially the same with the sum of both protrusion bodies' 147, 148 depth D1, D2.

Otherwise, the punched part can be thrown away and a hole 145 is left clear on the lateral cover 140 of the top chassis 100. Then, the clear hole can be a basis for an additional contact member (not shown) that is attached to either to the lateral cover 110 or the side wall 220.

With the opening 145 on the lateral cover 110, the side wall 220 of the bottom chassis 200 can be exposed partially to the outside of the LCD module in the vicinity of the CCFL 415, so hot air can move easily from around the CCFL 415 to outside of the LCD module 1000. Consequently, excessive heat around CCFL 415 can be released outside by convection.

In sum, by having the protrusion 140 as a heat passage, less heat may migrate to LC panel 300 and more heat may be released outside by thermal contact and convection.

Figure 2A:
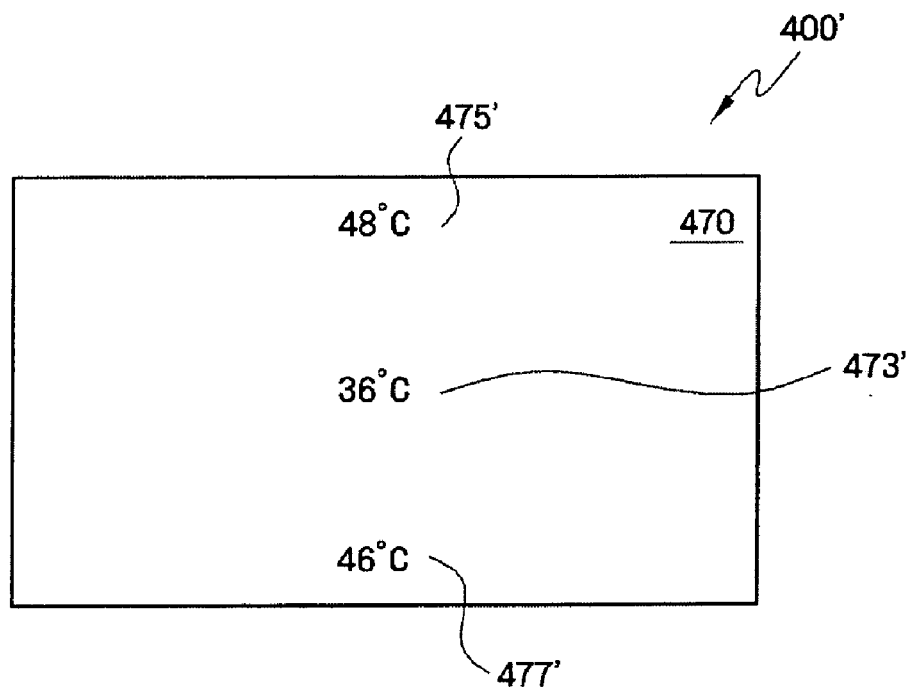
FIG. 2A is a plane view of a backlight assembly showing temperature distribution on the surface when no contact protrusion is engaged.

Now, the heat dissipation effect will be described with respect to FIGS. 2A and 2B. FIG. 2A is a plane view of a backlight assembly showing temperature distribution on the surface when no contact protrusion is engaged. On the contrary, FIG. 2B is a plane view of a backlight assembly showing temperature distribution when contact protrusion of FIG. 1 is engaged.

Figure 2B:
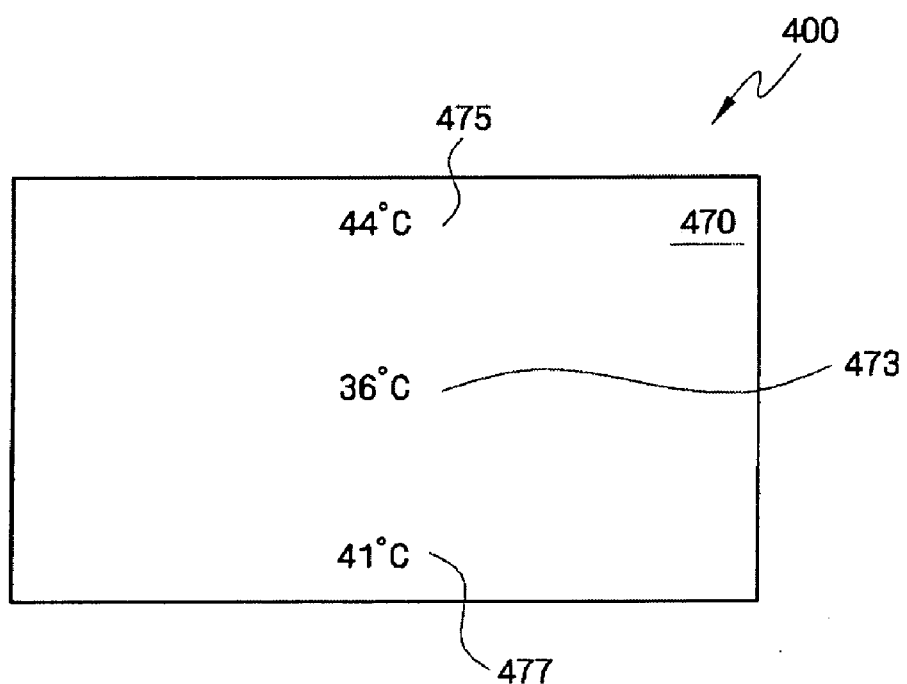
FIG. 2B is a plane view of a backlight assembly showing temperature distribution when contact protrusion of FIG. 1 is engaged.

Referring to FIGS. 2A and 2B, backlight assemblies 400, 400' has a light emitting surface 470, 470' with a middle part 473, 473' and a plurality of edge parts 475, 477, 475', 477'. Here, as shown in FIG. 2A, the middle part 473' of the light emitting surface 470' of the backlight assembly 400' is as high as 36° C. while the edge parts 475', 477' are 48° C. and 46° C., respectively.

The temperature difference is significant when the backlight 400' is combined with the LC panel (not shown) for completing the LCD module. That is, with the LCD module, considering the LC molecule's arrangement of the LC panel, as the temperature gets higher, the LC molecules' arrangement may be out of control causing poor image caused by light leakage.

For example, the LCD module employing the backlight assembly of FIG. 2A may not have any irregularity with the middle image as the temperature of the backlight is low enough to control LC molecules; whereas, the LCD module has an irregular image on at least one of the edge parts as the edge temperature of the backlight is high enough to lose control of LC molecules.

Generally, the irregularity appears along with light leakage at edge parts. Specifically, once LC molecules at the edge parts 475', 477' are out of control, the LC molecules at the edges 475', 477' are arranged differently from the LC molecules of the middle part 473' of the light emitting surface 470. Then, for example, light may leak along a 45 degree direction from an optical axis of a polarizer (not shown) on the upper glass of the LC panel (not shown).

Referring to FIG. 2B, the middle part 473 is as hot as the middle part 473' of FIG. 2A. However, the edge parts 475, 477 are cooler than the edge parts 475', 477' of FIG. 2A. According to basic characteristics of the LC molecules, the cooler LC molecules are more controllable than hotter LC molecules so as to cause less or no light leakage at the edge parts 475, 477.

Figure 3:
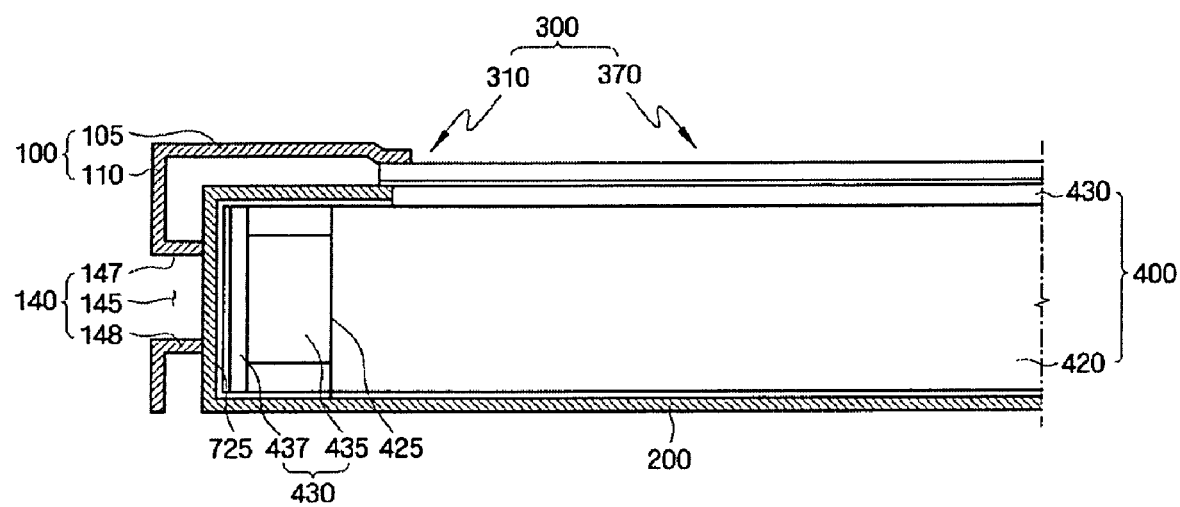
FIG. 3 is a cross-sectional view of a LCD module where the CCFL of FIG. 1 is substituted by a Light Emitting Diode (LED) assembly.

FIG. 3 is a cross-sectional view of a LCD module where the CCFL of FIG. 1 is substituted by a Light Emitting Diode (LED) assembly. According to FIG. 3, a LED assembly 430 sits at an edge of the backlight assembly 400. Presently, the LED assembly 430 is a competing light source with CCFL for its low power consumption and accurate color chromaticity. In detail, the LED assembly 430 of FIG. 3 is a set of LEDs 435 on a Printed Circuit Board (PCB) 437 and faces a light incident surface 425 of a LGP 420.

Like CCFL, not all electricity is converted to optical energy when LED assembly 430 is operated. Therefore, heat dissipation is still needed for similar reason as the CCFL backlight assembly. That is, less heat should be transferred to a LC panel 300, especially at an edge portion 310 of the LC panel 300; heat originated from the LED assembly 430 should be moved out through a contact protrusion 140.

However, the detailed structure may be different from the CCFL backlight assembly as the LED assembly 430 has a PCB 437 attached to the inner side of the side wall 225 and LEDs 435 are almost adhered to the light incident surface 425 of the LGP 420.

Especially, the adhesion structure of PCB 437 to the side wall 220 of the bottom chassis 200 is needed for effective heat dissipation of each of the LEDs 435. Here, the thermal passage structure with contact protrusion 140 will even promote the heat dissipation. Moreover, when the contact protrusion 140 connects top chassis 100 and the bottom chassis 200, the contact protrusion 140 may be located to be overlapped with at least one of the LEDs 435 because the overlap will shorten the path of the heat transfer. Particularly, heat transfer would be accomplished by both thermal conduction via protrusion body 147 of the contact protrusion 140 and conviction via opening 145 of the contact protrusion 140.

Even though FIG. 3 depicts top emitting LEDs 435 in the LED assembly 430, side emitting LED assembly may be used with the PCB attached to the lower plane 210 of the bottom chassis 200.

Figure 4:
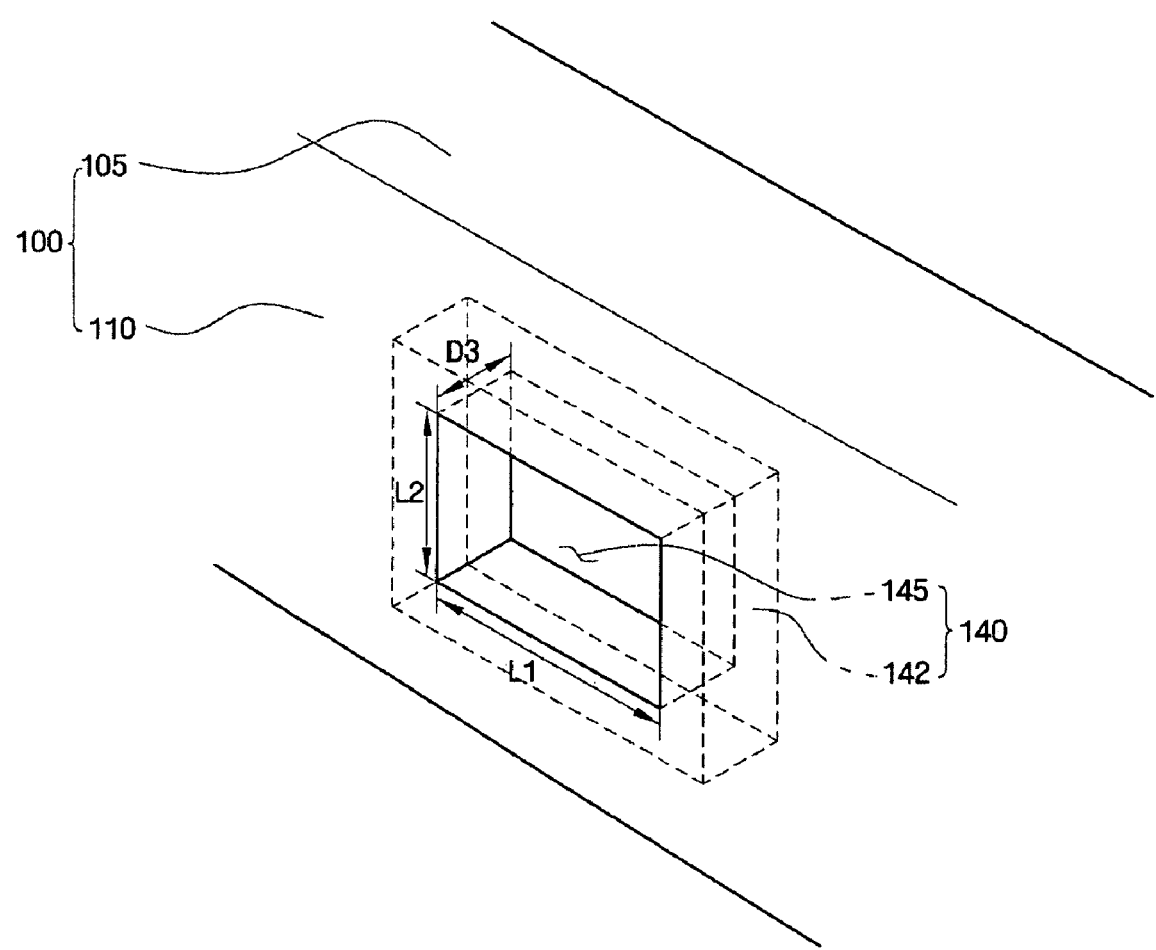
FIG. 4 is an enlarged schematic view of a top chassis whose contact protrusion has larger opening length than the inwardly extended depth.

FIG. 4 is an enlarged schematic view of a top chassis whose contact protrusion has a larger opening length than the inwardly extended depth. Referring to FIG. 4, the top chassis 100 has a substantially rectangular shaped opening 145 whose longest length L1 expands to the longitudinal direction of the lateral cover 110 of the top chassis 100. The rectangular shaped opening 145 also has a shortest length L2 in a direction perpendicular to the long side of the lateral cover 110 of the top chassis 100.

In turn, the contact protrusion 140 extends inwardly to the side wall of the bottom chassis (not shown) as long as the innermost part 142 reaches the side wall. Here, the inwardly extended depth of the contact protrusion 140 is D3. For an effective heat releasing structure, the length of the opening L1, L2 may be longer than the depth D3 because the bigger length L1, L2 can accommodate more massive air flow to the outer atmosphere; in contrast, the smaller depth D3 can aid rapid heat transfer from the light source unit (not shown) to the lateral cover 110 of the top chassis 100.

With respect to the length of the opening and the depth of the protrusion body, the opening may have any shape so long as low manufacturing cost or easiness of contacting the side wall of the bottom chassis is satisfied. For example, the opening may have circular, triangular or any other polygonal shape.

Figure 5:
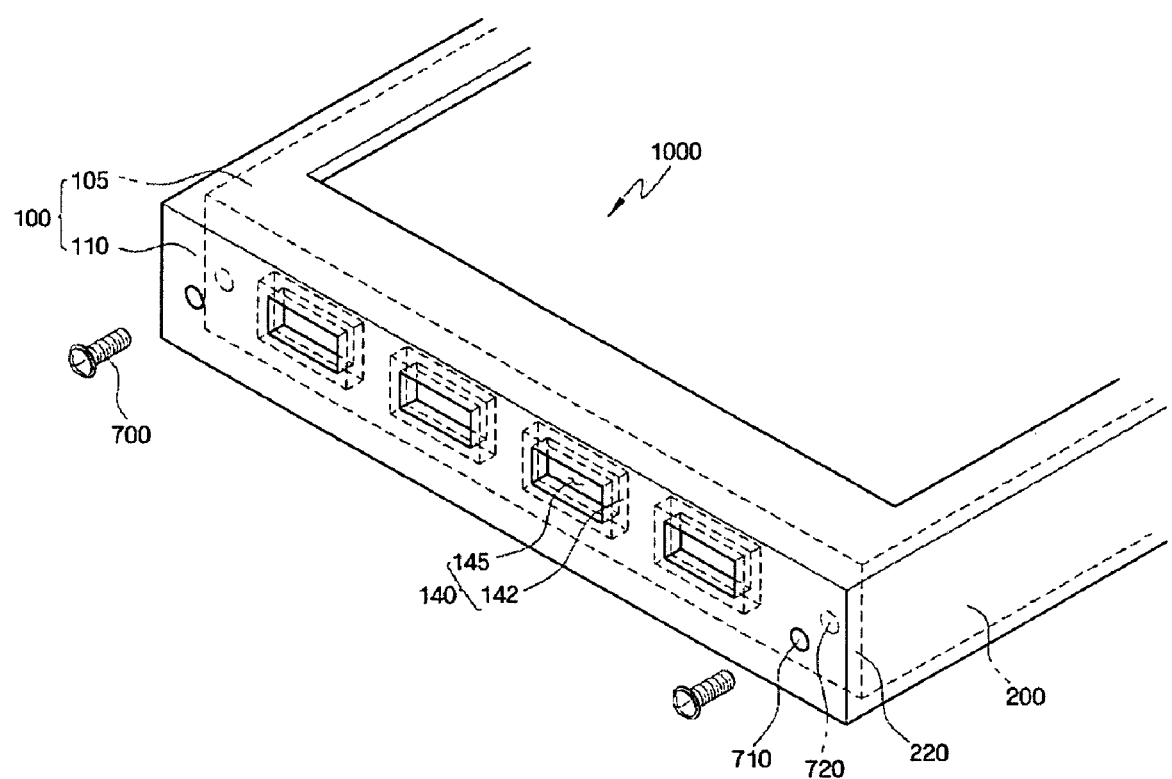
FIG. 5 is a simplified perspective view of a LCD module whose top chassis and bottom chassis are combined with a unifying member while a heat dissipating contact protrusion is formed at a different position from the unifying member's position.

FIG. 5 is a simplified perspective view of a LCD module whose top chassis and bottom chassis are combined with a unifying member while a heat dissipating contact protrusion is formed at different position from the unifying member's position. Referring to FIG. 5, the LCD module 1000 has a unifying member 700 to affix a lateral cover 110 of a top chassis 100 to a side wall 220 of a bottom chassis 200 by combining both the lateral cover 110 and the side wall 220 on the lateral part of the LCD module 1000.

One example of the unifying member 700 may be a metal screw, as shown in FIG. 5. In addition to the connecting function, the metal screw may also contribute to heat transfer from the inner space to the outer atmosphere of the LCD module. However, as the LCD module 1000 gets more compact and thinner, more internal heat around the light source unit (not shown) should be transferred to the outer atmosphere, rather than to other parts of LCD module 1000 like the LC panel (not shown). Therefore, the lateral part of the LCD module 1000 has a contact protrusion 140 which is describe above.

The co-existence of the unifying member 700 and the contact protrusion 140 is also beneficial for secure contact of the contact protrusion 140 to the side wall 220 of the bottom chassis 200. For example, when a screw is used as a unifying member 700, as the screw 700 is fastened and the lateral cover 110 and the side wall 220 are getting closer, the innermost part 142 of the neighboring contact protrusion 140 is also getting closer to the side wall 220 of the bottom chassis 200.

In other words, when screwing, the screw 700 is inserted into a first fixing hole 710 of the lateral cover 110 to go toward a second fixing hole 720 of the side wall 220. Then, a lateral cover portion around the first fixing hole 710 and a side wall portion around the second fixing hole 720 pull toward each other. Here, because the lateral cover 110 and the side wall 220 include the protrusion contact 140 between them, the protrusion contact 140 can be connected to the lateral cover 110 and the side wall 220.

Finally, after the screw 700 successfully combines the lateral cover 110 and the side wall 220, the contact protrusion 140 is fully connected with the side wall 220 of the bottom chassis 200 and heat transfer can be improved.

In FIG. 5, any of the top chassis and the bottom frame can be made of materials with high thermal conductivity such as aluminum (Al), stainless steel or SECC (Steel, Electrogalvanized, Cold-rolled, Coil). Among those materials above, SECC can be used as a bottom frame because SECC is cheaper and lighter than other materials while SECC has high thermal conductivity.

Figure 6:
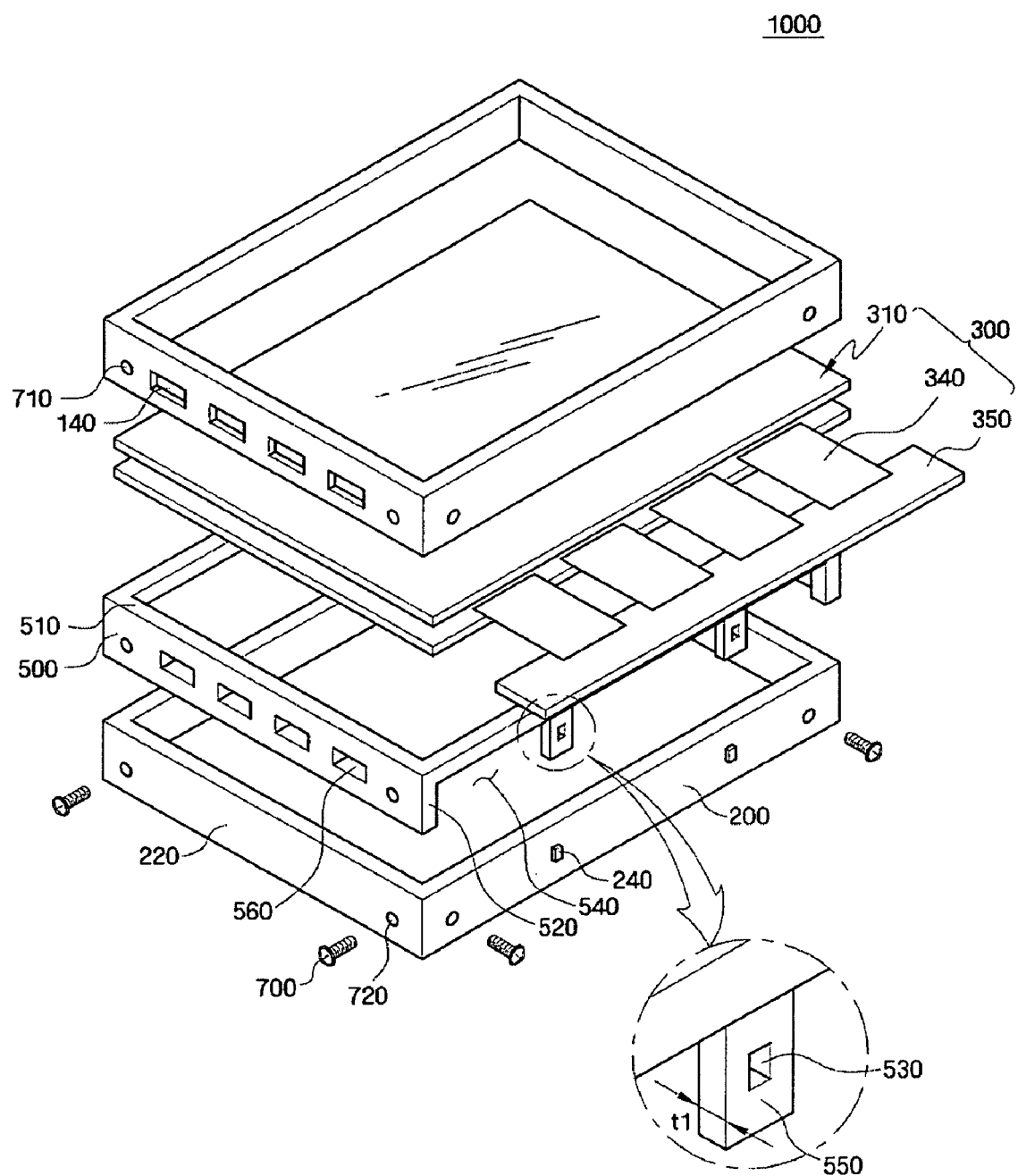
FIG. 6 is a simplified exploded view of a LCD module in which a middle frame between a top chassis and a bottom frame is located.

FIG. 6 is a simplified exploded view of a LCD module in which a middle frame between a top chassis and a bottom frame is located. Referring to FIG. 6, the LCD module 1000 has three rectangular parts 100, 200, 500 by which other parts are supported. The first rectangular part is bottom chassis 200 which is combined with the second rectangular part, top chassis 100. The third rectangular part is a middle frame 500 on which a LC panel 300 is positioned with its edge portion 310. In other words, a LC panel supporting part 510 of the middle frame 500 supports the edge portion 310 of the LC panel 300.

Here, because the LC panel supporting part 510 has a predetermined thickness, LC panel 300 can maintain a gap with a backlight assembly 400 and prohibits direct heat transfer from the light source part (not shown) to the LC panel 300 to suppress undesired light leakage at the edge portion 310 of the LC panel 300.

The middle frame 500 also has a vertical side 520 which vertically extends from the LC panel supporting part 510. The vertical side 520 is substantially parallel to both lateral cover 110 of the top chassis 100 and the side wall 220 of the bottom chassis 200. The vertical side 520 may be used to fix the middle frame 500 to either inside of lateral cover 110 of the top chassis 100 or outside of the side wall 220 of the bottom chassis 200 with a predetermined thickness T1. For example, the side wall 220 has a boss 240 combined with a fixing hole 530 of the vertical side 520 of the middle frame 500.

Here, the depth of the contact protrusion 140 may be the same or deeper than the vertical side's thickness T1 because the contact protrusion 140 is inwardly elongated from the lateral cover 110 of the top chassis 100 to the side wall 220 of the bottom chassis 200 when vertical side 520 is positioned inbetween.

Particularly, when a unifying member 700 is inserted through a first fixing hole 710 of the lateral cover 110 to meet the second fixing hole 720 of the side wall 220, the vertical side 520 is disposed inbetween the tightly combined lateral cover 110 and the side wall 220. At the same time, because the contact protrusion 140 should connect both lateral cover 110 and side wall 220, the vertical side 520 may be as thick as the contact protrusion 140 or slightly less thick than the contact protrusion 140.

In other aspects of the invention, the vertical side 520 of the middle frame 500 has a cutout 540 for accommodating a flexible film 340 which transmits an electric signal from an outer circuitry (not shown) to LC panel 300. In FIG. 6, the outer circuitry provides an electric signal to intermediate PCB 350 which is bonded to the flexible film 340.

Specifically, the flexible film 340 surrounds a portion of the side wall 220 of the bottom chassis 200 while the contact protrusion 140 is positioned next to the flexible film 340. Here, a light source unit (not shown) may be located beside the inner surface of the side wall 220 in which the flexible film 340 surrounds. Further, for providing enough space to the flexible film 340 and contact protrusion 140, the cutout 540 may be so wide as to leave a narrow rib 550 between neighboring cutouts 540.

Assuming no flexible film is engaged at one edge of the LCD module 1000, still a cutout 560 may be present at the vertical side 520 of the middle frame 500 because the contact protrusion 140 needs a space for being directly connected to the lateral cover 110 of the top chassis 100 and the side wall 220 of the bottom chassis 200. Here, because the flexible film does not suppress the spatial design of the LCD module 1000, the contact protrusion 140 may widely expose the side wall 220 of the bottom chassis 200 as long as enough heat releasing is accomplished. In addition, the cutout 560 may have a closed rectangular shape for mechanical strength of the LCD module 1000.

Figure 7:
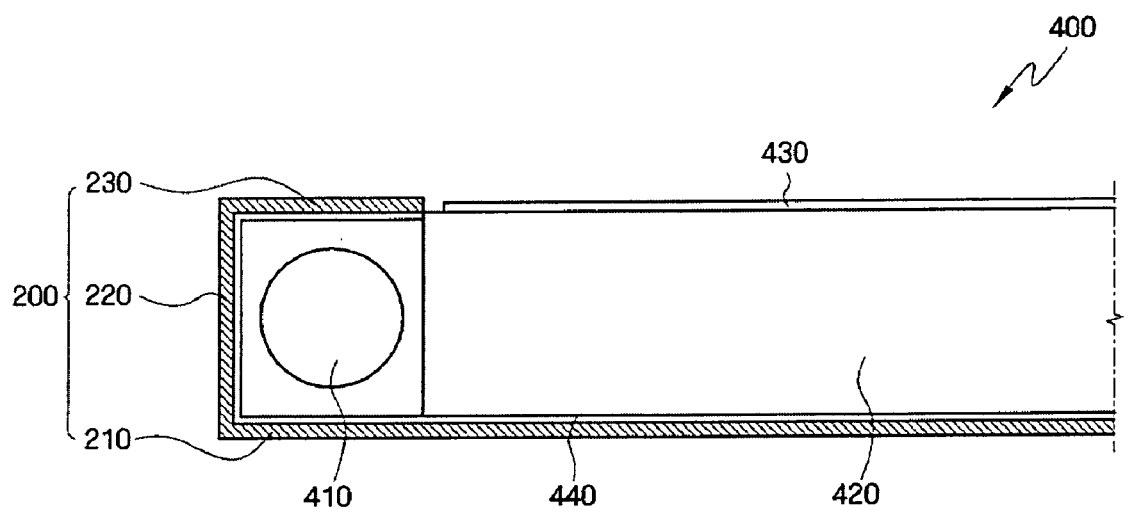
FIG. 7 is a cross-sectional view of a backlight assembly received by a bottom chassis which is surrounded by a bottom plane, a side wall and a top plane.

FIG. 7 is a cross-sectional view of a backlight assembly received and surrounded by a bottom plane, a side wall and a top plane of a bottom chassis. Referring to FIG. 7, the bottom chassis 200 has a bottom plane 210 that supports a LGP 420, a side wall 220 that extends from the bottom plane 210, and a top plane 230 which is bent from the side wall 220. Here, the bottom plane 210, side wall 220, and top plane 230 are not separable and unified for collectively redirecting light from the light source 410 to the LGP 420. With the unified structure, the bottom chassis 200 provides more surfaces for heat dissipation as the bottom plane 210, side wall 220 and top plane 230 have high thermal conductivity and are interconnected.

Further, a middle frame may be removed from the LCD module if the LC panel (not shown) is disposed on the top plane 230 of the bottom chassis 200. Here, an insulation film may be placed between the top plane 230 and the LC panel. Meanwhile, when unified bottom chassis 200 is engaged, an additional reflection sheet 440 may be located between the light source unit 410 and the bottom plane 210 of the bottom chassis 200 for promoting light reflection.

Figure 8:
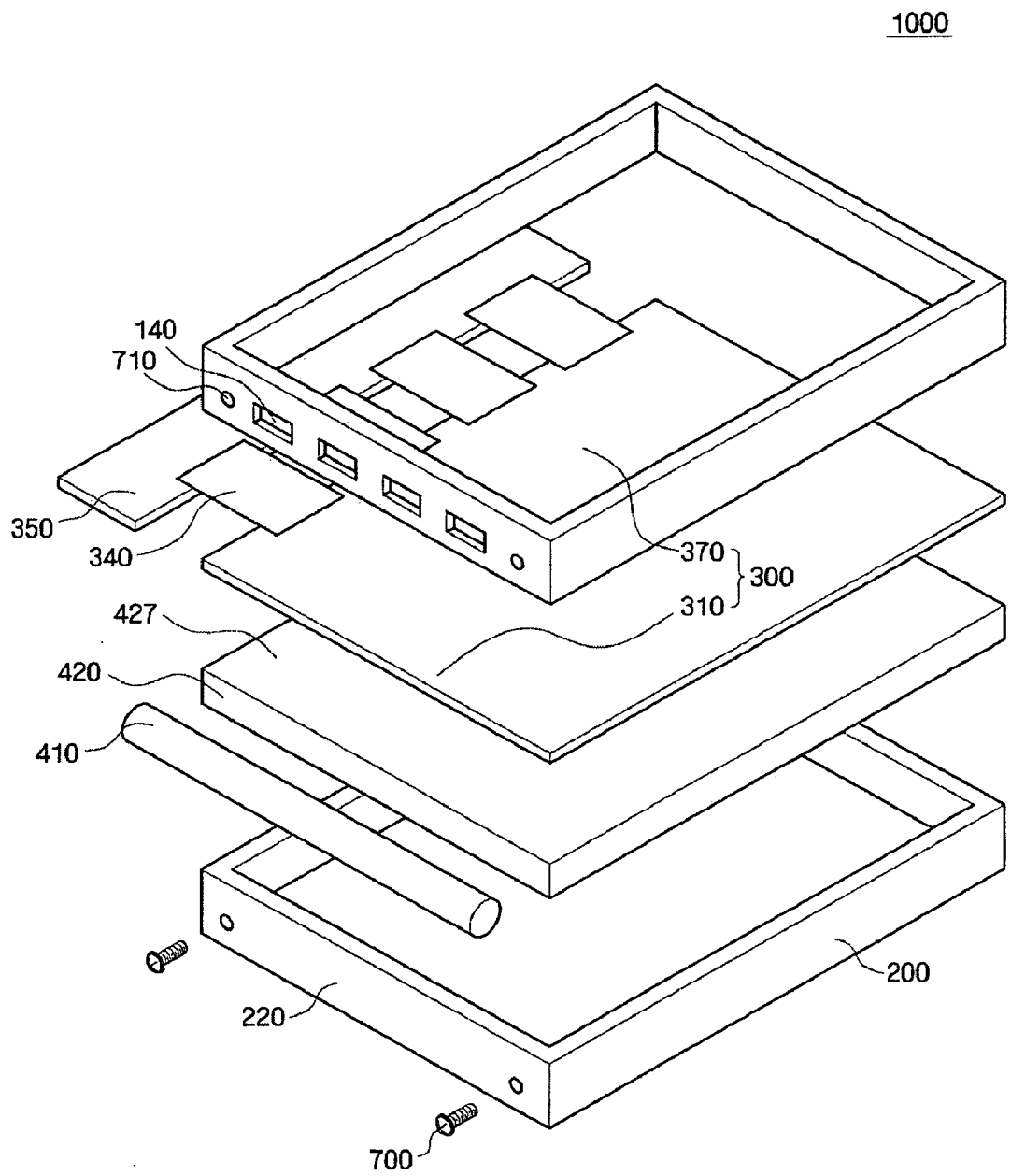
FIG. 8 is an exploded view of an LCD module showing a manufacturing method of the present invention.

FIG. 8 is an exploded view of an LCD module showing a manufacturing method of the present invention. Referring to FIG. 8, a bottom chassis 200 is provided with its bottom plane (not shown) and a side wall 220. The bottom plane 210 and the side wall 200 accommodate a LGP 420 and a light source 410 next to the LGP 420. Above the LGP 420, a LC panel is located while the light emitting surface 427 is overlapped with the active area 370 of the LC panel 300.

Here, a plurality of flexible films 340 is attached to one edge of the LC panel 300 with one end and is bonded to an intermediate PCB 350 with the other end. Unlike the stretched figure shown in FIG. 8, each of the flexible films 340 surrounds the side wall 220 of the bottom chassis 200 when the LCD module assembling is finished.

In the manufacturing process, the top chassis 100 covers the edge sides 360 of the LC panel 300 to leave the active area 370 of the LC panel 300 uncovered. Moreover, the lateral cover 110 overlaps the side wall 220 of the bottom chassis 200. At the same time, the contact protrusion 140 may connect the lateral cover 110 and the side wall 220 with an innermost part 142 for providing a thermal passage.

Then, the lateral cover 110 and side wall 220 may be combined with a unifying member 700 like a screw. The unifying member of the embodiment may include any type of mechanical combining structure or member for combining the lateral cover 110 and side wall 220 such as a hole and boss structure. Here, although the contact protrusion 140 is placed differently with the unifying member 700, fastening with the unifying member 700 may cause more tight contact of the innermost part 142 of the contact protrusion 140 to the side wall 220.

Even though the middle frame is not shown in FIG. 8, the middle frame may be interposed between the top chassis 100 and the bottom chassis 200 for supporting the side edge 360 of the LC panel. Moreover, the middle frame may have a vertical side located inbetween the lateral cover 110 and the side wall 220. The vertical side may also have a cutout for placing flexible film 340 or for providing space to the contact protrusion 140.

Throughout the above-described embodiments, the contact protrusion is explained as a protruded structure which extends from either the lateral cover or the side wall. The contact protrusion may be understood to be a thermally connecting medium that can be altered from the contact protrusion to any shape and/or part as long as thermal communication between the lateral cover and the side wall is accomplished.

Furthermore, the above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

What is claimed is:

1. A liquid crystal display module, comprising:
   a liquid crystal panel having an active display area and a plurality of edges surrounding the active display area,
   a light source emitting light to the liquid crystal panel,
   a light guiding plate receiving and emitting light with a light incident surface and a light emitting surface respectively,
   a bottom chassis accommodating the light source and the light guiding plate with a bottom plane and a side wall, the side wall disposed next to the light source,
   a top chassis covering the edges of the liquid crystal panel with a liquid crystal panel edge cover and overlapping the side wall of the bottom chassis with a lateral cover, and
   a contact protrusion disposed between the lateral cover and the side wall, the contact protrusion connecting the lateral cover to the side wall,
   wherein the contact protrusion has an opening which exposes a portion of an exterior major surface plane defining the side wall of the bottom chassis,
   wherein the contact protrusion is bent from the lateral cover and elongated toward the side wall with a first depth D1.

2. The liquid crystal display module of claim 1, wherein the opening has a first internal length L1 longer than the first depth D1.

3. The liquid crystal display module of claim 2, wherein the opening has a plurality of internal length whose shortest is the first internal length I1.

4. The liquid crystal display module of claim 3, wherein the opening has substantially rectangular shape extending lengthwise of the side wall.

5. The liquid crystal display module of claim 1, further comprising a unifying member mechanically combines the top chassis and the bottom chassis at different position from the contract protrusion.

6. The liquid crystal display module of claim 1, further comprising a middle frame disposed between the tip chassis and the bottom chassis, the middle frame supports the liquid crystal panel with a liquid crystal panel supporting part and selectively combined with the top chassis or the bottom chassis with a coupling structure that is vertically extended from the liquid crystal panel supporting part.

7. The liquid crystal display module of claim 6, wherein the contact protrusion is differently positioned from a fixing part, which connects the bottom chassis to the top frame.

8. The liquid crystal display module of claim 6, wherein the middle frame further comprising a cutout exposing a portion of the side wall of the bottom frame.

9. The liquid crystal display module of claim 8, wherein the contact protrusion has a first depth D1 measured from the lateral cover outer surface to the side wall outer surface, and the middle frame has a first thickness T1 smaller than D1.

10. The liquid crystal display module of claim 8, wherein the liquid crystal panel further comprises a flexible film affixed to one of the edges and surrounds the cutout along the thickness direction of the liquid crystal display, and the contact protrusion contacts the side wall at different position of the flexible film.

11. The liquid crystal display module of claim 1, wherein the bottom chassis has both the bottom plane and the side wall in a single unit.

12. The liquid crystal display module of claim 11, further comprising a top plane connected with the side wall above the light source, wherein the bottom plane, side wall and the top plane collectively redirect light from the light source to the incident surface of the light guiding plate.

13. The liquid crystal display module of claim 12, wherein the light from the lamp is directly reflected by the bottom plane, the side wall, and top plane without any intervening part.

14. The liquid crystal display module of claim 12, wherein the light from the lamp is reflected by a reflector sheet interposed between the bottom chassis and the light source, the reflector sheet elongated to the top plane from the bottom plane.

15. The liquid crystal display module of claim 1, the contact protrusion having an innermost portion that fully contacts with the side wall of the bottom chassis.

16. The liquid crystal display module of claim 1, wherein the bottom chassis has a first thermal conductivity and the top chassis has a second thermal conductivity higher than the first thermal conductivity.

17. The liquid crystal display module of claim 16, wherein the bottom chassis is made of Steel, Electrogalvanized, Cold-rolled, Coil (SECC).

18. The liquid crystal display module of claim 1, the light source is cold cathode fluorescent lamp (CCFL).

19. The liquid crystal display module of claim 1, the light source is a light emitting diode (LED) assembly, the light emitting diode assembly comprises a plurality of light emitting diodes and a printed circuit board (PCB) where the light emitting diode is attached.

20. The liquid crystal display module of claim 19, the printed circuit board of the light emitting diode assembly is adhered to the side wall of the bottom chassis.

21. The liquid crystal display module of claim 20, the contact protrusion has an opening exposing a portion of the side wall of the bottom chassis, at least one of the light emitting diode of the light emitting diode assembly overlaps the opening of the contact protrusion.

22. A method for making liquid crystal display, the method comprising,
- providing a bottom chassis, the bottom chassis comprising a bottom plane and a side wall,
- placing a light source above the bottom plane,
- disposing a light guiding plate next the light source,
- covering the light guiding plate with a liquid crystal panel with an active display area of the liquid crystal panel,
- covering a plurality of edge sides of the liquid crystal panel with an edge cover of a top chassis, the top chassis having a lateral surface that overlaps the side wall of the bottom chassis, and
- forming a thermal contact with a contact protrusion interposed between the lateral cover of the top chassis and a side wall of the bottom chassis,
- wherein the contact protrusion is located in a different position from a fixing part that mechanically adjoins the top chassis and the bottom chassis, and
- wherein the contact protrusion has an opening which exposes a portion of an exterior major surface plane defining the side wall of the bottom chassis,
- wherein the contact protrusion is bent from the lateral cover and elongated toward the side wall with a first depth D1.

* * * * *